United States Patent
Johnson et al.

(10) Patent No.: US 10,242,706 B1
(45) Date of Patent: Mar. 26, 2019

(54) DATA STORAGE DEVICE DETECTING SPINDLE MOTOR POSITION AT INCREASED RESOLUTION USING MUTUAL INDUCTIVE SENSE

(71) Applicant: Western Digital Technologies, Inc., San Jose, CA (US)

(72) Inventors: Brian A. Johnson, Laguna Hills, CA (US); Timothy A. Ferris, Mission Viejo, CA (US); Jaesoo Byoun, Irvine, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 15/965,947

(22) Filed: Apr. 29, 2018

(51) Int. Cl.
| G11B 5/09 | (2006.01) |
| G11B 19/20 | (2006.01) |
| G11B 19/02 | (2006.01) |
| H02P 6/185 | (2016.01) |
| H02P 6/182 | (2016.01) |

(52) U.S. Cl.
CPC .......... G11B 19/2009 (2013.01); G11B 19/02 (2013.01); H02P 6/182 (2013.01); H02P 6/185 (2013.01)

(58) Field of Classification Search
None
See application file for complete search history.

(56) References Cited

U.S. PATENT DOCUMENTS

| 5,569,990 | A | | 10/1996 | Duffield | |
| 6,020,695 | A | * | 2/2000 | Kelly | G11B 19/20 318/34 |
| 6,078,158 | A | * | 6/2000 | Heeren | G11B 19/20 318/254.2 |
| 6,555,977 | B1 | | 4/2003 | Du et al. | |
| 7,006,320 | B1 | * | 2/2006 | Bennett | G11B 19/20 360/70 |
| 7,253,582 | B1 | | 8/2007 | Ding et al. | |
| 9,230,593 | B1 | * | 1/2016 | Nicholls | G11B 21/12 |
| 2002/0167287 | A1 | * | 11/2002 | Heydt | G11B 19/20 318/400.11 |
| 2005/0218846 | A1 | * | 10/2005 | Moser | G11B 19/20 318/376 |
| 2010/0277826 | A1 | * | 11/2010 | Sheffield | G11B 21/12 360/75 |
| 2013/0070363 | A1 | * | 3/2013 | Bennett | G11B 19/041 360/73.03 |
| 2017/0133962 | A1 | | 5/2017 | Boscolo Berto et al. | |

* cited by examiner

Primary Examiner — Peter Vincent Agustin (57) ABSTRACT

A data storage device is disclosed comprising a head actuated over a disk, and a spindle motor configured to rotate the disk. A first driving voltage is applied across a first and second windings of the spindle motor connected in series while measuring a first mutual inductance voltage across a third winding, wherein the first driving voltage comprises a first amplitude and a first polarity. A second driving voltage is applied across the first and second winding connected in series while measuring a second mutual inductance voltage across the third winding, wherein the second driving voltage comprises the first amplitude and a second polarity opposite the first polarity. The first measured mutual inductance voltage and the second measured mutual inductance voltage are combined to generate a first mutual inductance signal, and an angular position of the spindle motor is estimated based on the first mutual inductance signal.

40 Claims, 5 Drawing Sheets

DATA STORAGE DEVICE DETECTING SPINDLE MOTOR POSITION AT INCREASED RESOLUTION USING MUTUAL INDUCTIVE SENSE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
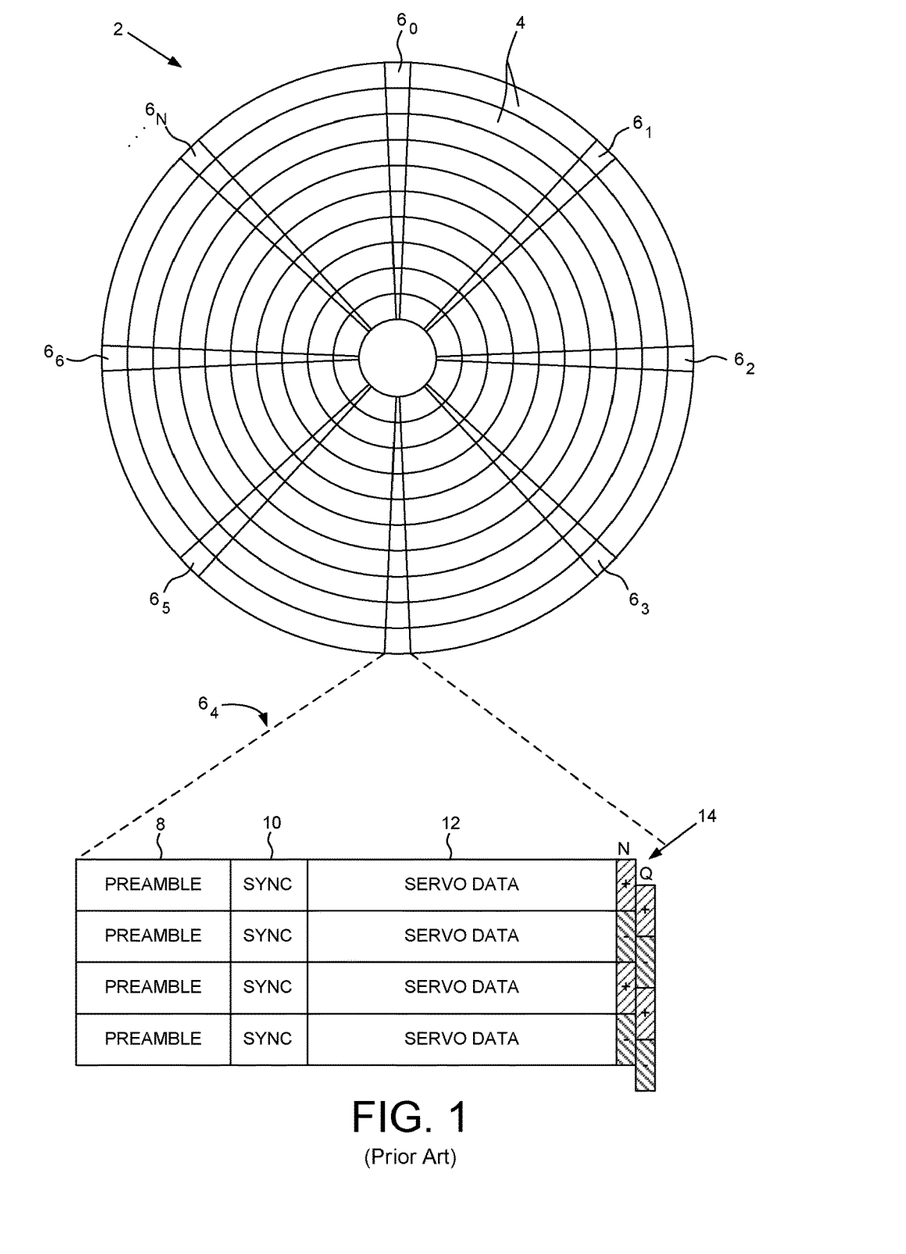
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
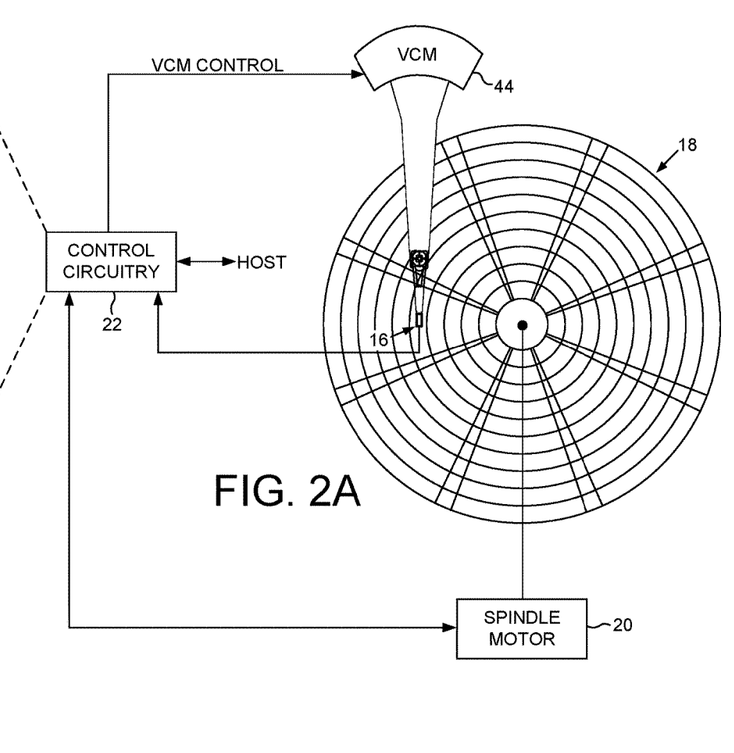
FIG. 2A shows a data storage device in the form of a disk drive comprising a head actuated over a disk and a spindle motor configured to rotate the disk, wherein the spindle motor comprises a plurality of windings.
Figure 2B:
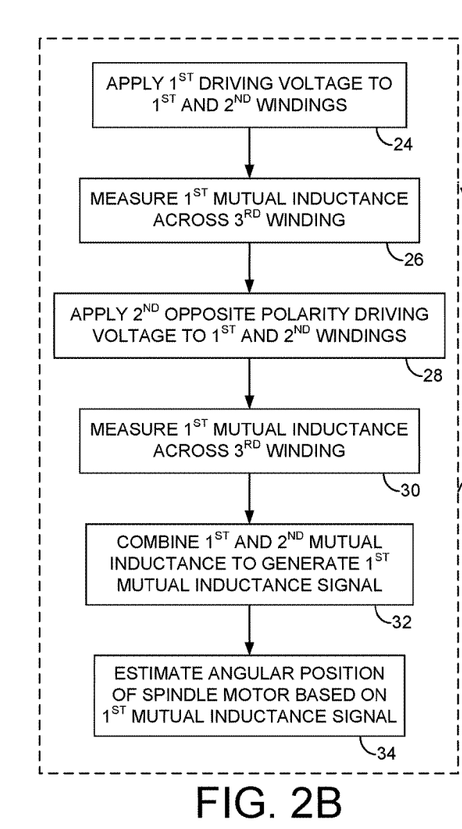
FIG. 2B is a flow diagram according to an embodiment wherein opposite polarity driving voltages are applied to two of the windings connected in series while measuring a mutual inductance voltage across a third winding used to generate a mutual inductance signal for estimating an angular position of the spindle motor.

FIG. 2A shows a data storage device in the form of a disk drive according to an embodiment comprising a head 16 actuated over a disk 18, and a spindle motor 20 configured to rotate the disk 18, wherein the spindle motor comprises a plurality of windings including a first, second and third winding. The disk drive further comprises control circuitry 22 configured to execute the flow diagram of FIG. 2B, wherein a first driving voltage is applied across the first and second windings connected in series (block 24) while measuring a first mutual inductance voltage across the third winding (block 26), wherein the first driving voltage comprises a first amplitude and a first polarity. A second driving voltage is applied across the first and second winding connected in series (block 28) while measuring a second mutual inductance voltage across the third winding (block 30), wherein the second driving voltage comprises the first amplitude and a second polarity opposite the first polarity. The first measured mutual inductance voltage and the second measured mutual inductance voltage are combined to generate a first mutual inductance signal (block 32), and an angular position of the spindle motor is estimated based on the first mutual inductance signal (block 34).

Figure 3:
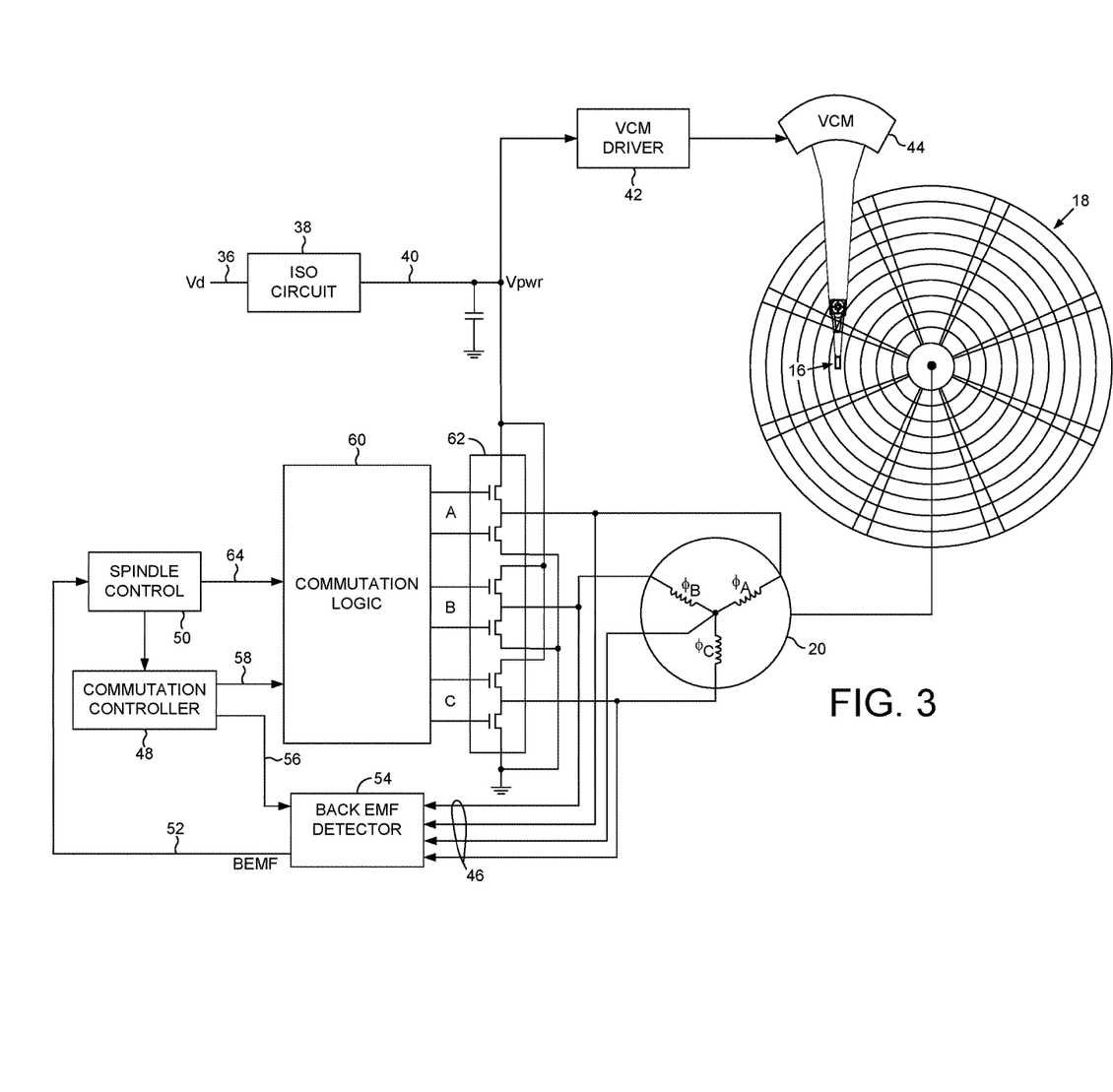
FIG. 3 shows control circuitry according to an embodiment for commutating the spindle motor.

FIG. 3 shows control circuitry 22 according to an embodiment wherein the disk drive receives a supply voltage 36 from a host which passes through an isolation circuit 38 to become a power voltage Vpwr 40 used to power the disk drive, including to power a VCM driver 42 for controlling a VCM 44 that actuates the head 16 over the disk 18. The power voltage Vpwr 40 also powers spindle control circuitry configured to commutate the spindle motor 20 in order to rotate the disk 18. A back electromotive force (BEMF) voltage 46 generated by the windings of the spindle motor 20 may be processed in order to drive the commutation sequence of a commutation controller 48. A spindle control block 50 may process a BEMF signal 52 which may be a square wave representing the BEMF zero-crossings as detected by a BEMF detector 54. The commutation controller 48 may generate a control signal 56 which configures the BEMF detector 54 to detect the zero-crossing of the BEMF voltage 46 generated by each winding as the disk rotates. The commutation controller 48 also generates a control signal 58 applied to commutation logic 60. In the embodiment of FIG. 3, the commutation logic 60 is configured by the control signal 58 to control the state of switches 62 in order to drive the windings with voltage Vpwr 40. The commutation logic 60 may operate in any suitable manner, such as by driving the switches 62 as linear amplifiers that apply continuous-time sinusoidal voltages to the windings. In another embodiment, the commutation logic 60 may drive the switches 62 using pulse width modulation (PWM), such as using square wave PWM, trapezoidal PWM, or sinusoidal PWM. Regardless as to how the windings are driven, the commutation controller 48 generates the control signal 58 so that the windings are commutated at the correct periods, thereby generating the desired rotating magnetic field that causes the spindle motor to rotate. In one embodiment, the spindle control block 50 may generate a control signal 64 that controls the effective amplitude of the periodic driving voltage applied to the windings (continuous or PWM), thereby controlling the speed of the spindle motor 20.

When the disk 18 is rotating at slow speed (e.g., when the disk is spinning up), the amplitude of the BEMF voltage 46 due to the disk rotating is typically very small making the zero crossings in the BEMF voltage 46 difficult to detect. However if a pair of the windings connected in series are excited by a driving voltage, the resulting magnetic flux induces a mutual inductance voltage across the undriven winding which varies with the angular position of the spindle motor. For example in the embodiment of FIG. 3, if a driving voltage is applied across a first winding φA connected in series with a second winding φB, the resulting magnetic flux induces a mutual inductance voltage across a third winding φC which varies with the angular position of the spindle motor. Prior art disk drives have estimated the angular position of the spindle motor by detecting a zero crossing in the mutual inductance voltage of each undriven winding as the angular position of the spindle motor changes at low speed. However, the zero crossing in the mutual inductance voltage may occur at too low a frequency (resolution), for example, to achieve a desired spin-up performance. For example, in a six pole pair spindle motor a zero crossing in the mutual inductance voltages may occur every sixty electrical degrees of the spindle motor which may be insufficient to achieve a desired spin-up performance.

In one embodiment, the resolution in estimating the angular position of the spindle motor is increased from sixty electrical degrees to thirty electrical degrees by driving each pair of windings with an opposite polarity driving voltage and combining (adding) the resulting mutual inductance voltages to generate a mutual inductance signal. Referring again to the example of FIG. 3, a mutual inductance signal (Ab+Ba) is generated for winding φC where Ab represents the mutual inductance voltage across winding φC when a positive polarity driving voltage is applied across windings φA and φB, and Ba represents the mutual inductance voltage across winding φC when a negative polarity driving voltage is applied across windings φA and φB. In one embodiment, the positive polarity driving voltage is applied across windings φA and φB by controlling switches 62 in FIG. 3 so as to connect winding φA to Vpwr 40 and connecting winding φB to ground, whereas the negative polarity driving voltage is applied across windings φA and φB by controlling switches 62 so as to connect winding φB to Vpwr 40 and connecting winding φA to ground. A similar mutual inductance signal (Bc+Cb) may be generated for winding φA, and a similar mutual inductance signal (Ac+Ca) may be generated for winding φB.

Figure 4:
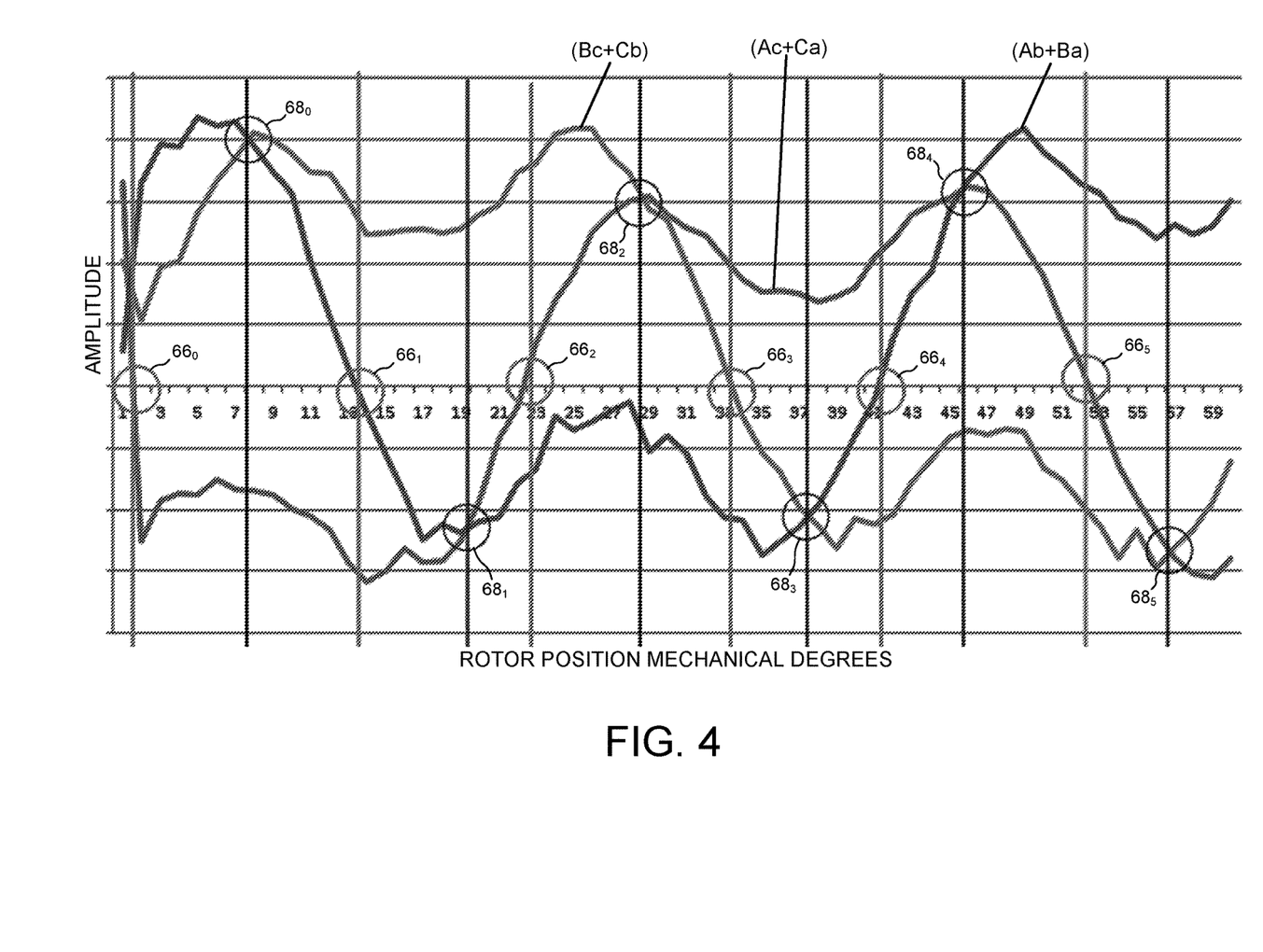
FIG. 4 is an example graph of a mutual inductance signal generated for each winding of the spindle motor at different angular positions, wherein a zero crossing or a mutual crossing is generated every thirty electrical degrees.

FIG. 4 shows an example of each of the three mutual inductance signals (Ab+Ba), (Bc+Cb), and (Ac+Ca) over a full electrical cycle as the angular position of the spindle motor changes. In one embodiment, the angular position of the spindle motor is estimated at each zero crossing $66_0$-$66_N$ of each mutual inductance signal, as well as at each mutual crossing $68_0$-$68_N$ of the mutual inductance signals, thereby achieving a thirty degree resolution (in electrical degrees) in the angular position estimate. The x-axis in FIG. 4 is shown as sixty mechanical degrees each of which represents one-sixth of an electrical degree for a six pole pair spindle motor (five mechanical degrees represents thirty electrical degrees).

Figure 5:
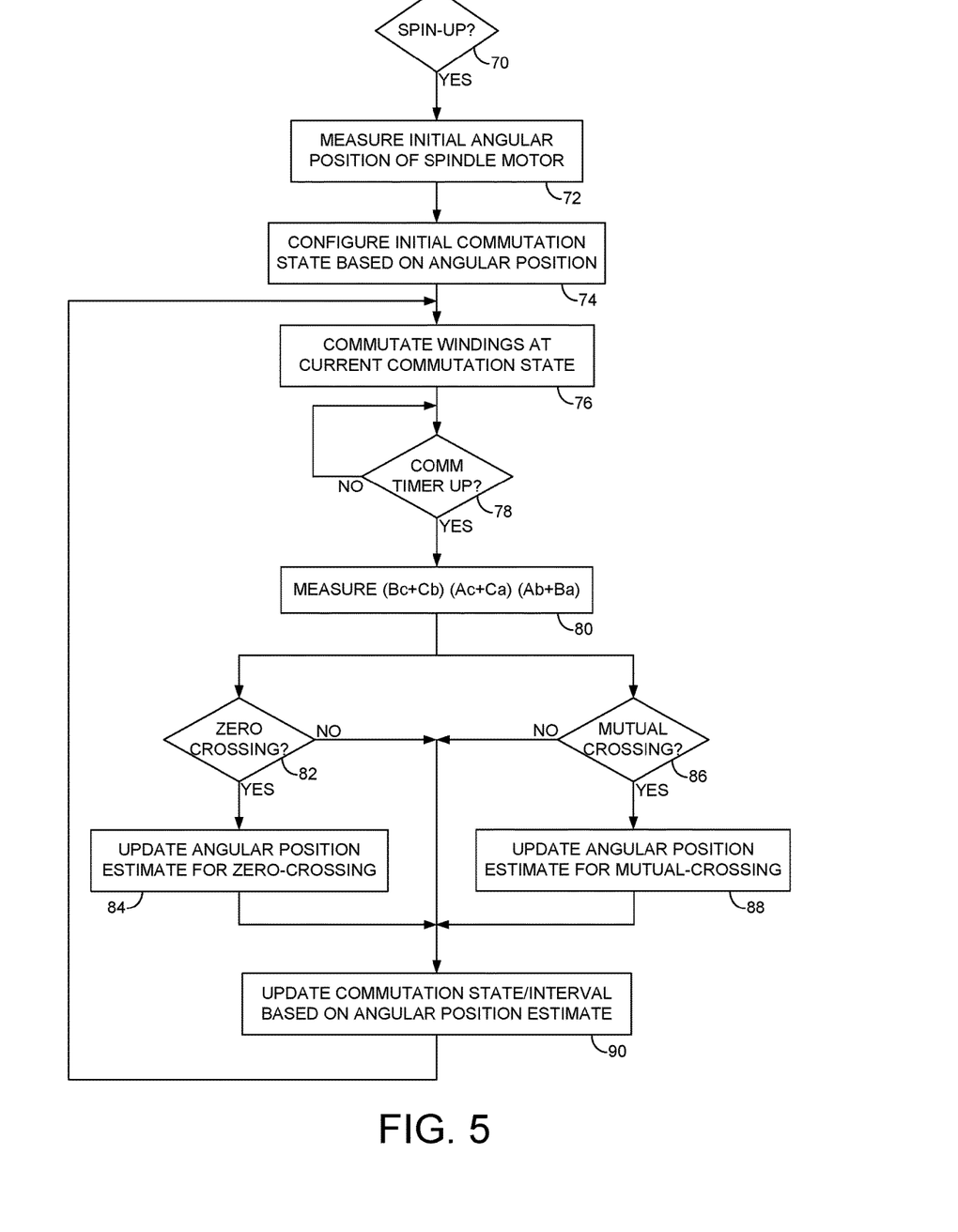
FIG. 5 is a flow diagram according to an embodiment wherein when spinning up the spindle motor, an initial angular position is estimated for commutating the windings and then the estimated angular position is updated based on the zero crossings and mutual crossings of the mutual inductance signals.

FIG. 5 is a flow diagram according to an embodiment wherein when spinning up the disk (block 70), an initial angular position of the spindle motor is measured using any suitable technique (block 72). An example technique for measuring the initial angular position is disclosed in U.S. Pat. No. 7,253,582 entitled "DISK DRIVE ESTIMATING ANGULAR POSITION OF SPINDLE MOTOR DURING SPIN-UP BY COMPUTING DIFFERENCES IN WINDING CURRENT RISE TIMES," the disclosure of which is incorporated herein by reference. The initial commutation state of the spindle motor is then initialized based on the measured angular position of the spindle motor (block 74). The windings of the spindle motor are then commutated at the current commutation state (block 76) for a commutation interval. When a commutation timer for timing the interval expires (block 78), the three mutual inductance signals are generated as described above (block 80). If a zero crossing is detected in one of the mutual inductance signals (block 82) such as shown in FIG. 4, the estimated angular position of the spindle motor is updated based on the detected zero crossing (block 84). If a mutual crossing is detected for two of the mutual inductance signals (block 86) such as shown in FIG. 4, the estimated angular position of the spindle motor is updated based on the detected mutual crossing (block 88). If neither a zero crossing or mutual crossing is detected, in one embodiment the angular position of the spindle motor may be updated by predicting the expected movement of the spindle motor at the end of the current commutation interval. In this embodiment, the error in the predicted angular position is corrected at blocks 84 and 88 when a zero crossing or mutual crossing is detected. The next commutation state and interval are then updated based on the estimated angular position of the spindle motor (block 90). The flow diagram is then repeated from block 76 until the spindle motor reaches sufficient speed to enable spindle motor control using the BEMF zero crossings as described above with reference to FIG. 3.

In one embodiment, at block 90 of FIG. 5 the commutation state may be incremented to the next sequential commutation state and the commutation interval decremented "blindly" until a zero crossing or mutual crossing is detected which indicates an error in the predicted angular position. The error may then be corrected by updating the angular position estimate based on the detected zero crossing or mutual crossing, and the next commutation state and interval selected based on the updated angular position estimate. For example, the commutation state and/or interval may be adjusted to compensate for a lag or lead in the measured angular position of the spindle motor relative to a target angular position. In one embodiment, any suitable filtering and/or feed-forward compensation may be employed to compensate for any mechanical tolerance of the spindle motor, for example, an asymmetrical alignment of the pole pairs which may induce an undesirable error in the angular position estimate.

Any suitable technique may be used to detect the zero crossings and mutual crossings in the mutual inductance signals such as shown in FIG. 4, including any configuration and/or combination of analog and digital circuitry. In one embodiment, a mutual inductance signal may be generated periodically by adding the corresponding mutual inductance voltages (stored by capacitors) using an analog adder, wherein a zero crossing and/or mutual crossing in the mutual inductance signals may be detected using suitable analog comparators. In another embodiment, the mutual inductance voltages may be converted into digital values using a suitable analog-to-digital converter (ADC), and the resulting digital values processed using any suitable digital circuitry (e.g., a microprocessor or state machine) in order to generate digital mutual inductance signals that are processed to detect the zero crossings and mutual crossings such as shown in FIG. 4.

Any suitable control circuitry may be employed to implement the flow diagrams in the above embodiments, such as any suitable integrated circuit or circuits. For example, the control circuitry may be implemented in a power integrated circuit, or in a component separate from the power integrated circuit, such as a disk controller, or certain operations described above may be performed by a power integrated circuit and others by a disk controller. In one embodiment, the power integrated circuit and disk controller are implemented as separate integrated circuits, and in an alternative embodiment they are fabricated into a single integrated circuit or system on a chip (SOC). In addition, the control circuitry may include a suitable preamp circuit and a read channel circuit implemented as separate integrated circuits, integrated into the or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The mutual inductance sensing techniques in the above described embodiments may be employed in any suitable device with an electric motor having windings configured to rotate the motor. Example devices other than data storage devices that may employ an electric motor include industrial equipment, consumer electronics, consumer appliances, electric transportation, etc. In each of these alternative applications, estimating the position of the electric motor using the mutual inductance sensing techniques described above may improve the performance and/or reduce the cost of the device by obviating the use of other types of position sensors, such as a conventional Hall effect sensor.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk;
   a spindle motor configured to rotate the disk, wherein the spindle motor comprises a plurality of windings including a first, second and third winding; and
   control circuitry configured to:
      apply a first driving voltage across the first and second windings connected in series while measuring a first mutual inductance voltage across the third winding, wherein the first driving voltage comprises a first amplitude and a first polarity;
      apply a second driving voltage across the first and second windings connected in series while measuring a second mutual inductance voltage across the third winding, wherein the second driving voltage comprises the first amplitude and a second polarity opposite the first polarity;
      combine the first measured mutual inductance voltage and the second measured mutual inductance voltage to generate a first mutual inductance signal; and
      estimate an angular position of the spindle motor based on the first mutual inductance signal.

2. The data storage device as recited in claim 1, wherein the control circuitry is further configured to generate the first mutual inductance signal by adding the first measured mutual inductance voltage and the second measured mutual inductance voltage.

3. The data storage device as recited in claim 1, wherein the control circuitry is further configured to estimate the angular position of the spindle motor based on a zero crossing of the first mutual inductance signal.

4. The data storage device as recited in claim 1, wherein the control circuitry is further configured to:
   apply the first driving voltage across the second and third windings connected in series while measuring a third mutual inductance voltage across the first winding;
   apply the second driving voltage across the second and third windings connected in series while measuring a fourth mutual inductance voltage across the first winding;
   combine the third measured mutual inductance voltage and the fourth measured mutual inductance voltage to generate a second mutual inductance signal; and
   estimate an angular position of the spindle motor based on the first mutual inductance signal and the second mutual inductance signal.

5. The data storage device as recited in claim 4, wherein the control circuitry is further configured to generate the second mutual inductance signal by adding the third measured mutual inductance voltage and the fourth measured mutual inductance voltage.

6. The data storage device as recited in claim 4, wherein the control circuitry is further configured to estimate the angular position of the spindle motor based on a mutual crossing of the first mutual inductance signal with the second mutual inductance signal.

7. The data storage device as recited in claim 6, wherein the control circuitry is further configured to estimate the angular position of the spindle motor based on a zero crossing of the first mutual inductance signal and a zero crossing of the second mutual inductance signal.

8. The data storage device as recited in claim 7, wherein the mutual crossing is separated from the zero crossing of the first mutual inductance signal by approximately thirty electrical degrees of the spindle motor.

9. A data storage device comprising:
   a disk;
   a head actuated over the disk;
   a spindle motor configured to rotate the disk, wherein the spindle motor comprises a plurality of windings including a first, second and third winding; and
   control circuitry configured to:
       apply a first driving voltage across the first and second windings connected in series while measuring a first mutual inductance voltage across the third winding;
       apply a second driving voltage across the first and second windings connected in series while measuring a second mutual inductance voltage across the third winding;
       combine the first measured mutual inductance voltage and the second measured mutual inductance voltage to generate a first mutual inductance signal;
       apply the first driving voltage across the second and third windings connected in series while measuring a third mutual inductance voltage across the first winding;
       apply the second driving voltage across the second and third windings connected in series while measuring a fourth mutual inductance voltage across the first winding;
       combine the third measured mutual inductance voltage and the fourth measured mutual inductance voltage to generate a second mutual inductance signal; and
       estimate an angular position of the spindle motor based on a zero crossing of the first mutual inductance signal, a zero crossing of the second mutual inductance signal, and a mutual crossing of the first mutual inductance signal with the second mutual inductance signal.

10. The data storage device as recited in claim 9, wherein the mutual crossing is separated from the zero crossing of the first mutual inductance signal by approximately thirty electrical degrees of the spindle motor.

11. A method of operating a data storage device, the method comprising:
   connecting in series a first winding and a second winding of a spindle motor configured to rotate a disk;
   applying a first driving voltage across the first and second windings connected in series while measuring a first mutual inductance voltage across a third winding of the spindle motor, wherein the first driving voltage comprises a first amplitude and a first polarity;
   applying a second driving voltage across the first and second windings connected in series while measuring a second mutual inductance voltage across the third winding, wherein the second driving voltage comprises the first amplitude and a second polarity opposite the first polarity;
   combining the first measured mutual inductance voltage and the second measured mutual inductance voltage to generate a first mutual inductance signal; and
   estimating an angular position of the spindle motor based on the first mutual inductance signal.

12. The method as recited in claim 11, further comprising generating the first mutual inductance signal by adding the first measured mutual inductance voltage and the second measured mutual inductance voltage.

13. The method as recited in claim 11, further comprising estimating the angular position of the spindle motor based on a zero crossing of the first mutual inductance signal.

14. The method as recited in claim 11, further comprising:
   applying the first driving voltage across the second and third windings connected in series while measuring a third mutual inductance voltage across the first winding;
   applying the second driving voltage across the second and third windings connected in series while measuring a fourth mutual inductance voltage across the first winding;
   combining the third measured mutual inductance voltage and the fourth measured mutual inductance voltage to generate a second mutual inductance signal; and
   estimating an angular position of the spindle motor based on the first mutual inductance signal and the second mutual inductance signal.

15. The method as recited in claim 14, further comprising generating the second mutual inductance signal by adding the third measured mutual inductance voltage and the fourth measured mutual inductance voltage.

16. The method as recited in claim 14, further comprising estimating the angular position of the spindle motor based on a mutual crossing of the first mutual inductance signal with the second mutual inductance signal.

17. The method as recited in claim 16, further comprising estimating the angular position of the spindle motor based on a zero crossing of the first mutual inductance signal and a zero crossing of the second mutual inductance signal.

18. The method as recited in claim 17, wherein the mutual crossing is separated from the zero crossing of the first mutual inductance signal by approximately thirty electrical degrees of the spindle motor.

19. A method of operating a data storage, the method comprising:
   connecting in series a first winding and a second winding of a spindle motor configured to rotate a disk;
   applying a first driving voltage across the first and second windings connected in series while measuring a first mutual inductance voltage across a third winding of the spindle motor;
   applying a second driving voltage across the first and second windings connected in series while measuring a second mutual inductance voltage across the third winding;
   combining the first measured mutual inductance voltage and the second measured mutual inductance voltage to generate a first mutual inductance signal;
   connecting in series the second winding and the third winding of the spindle motor;
   applying the first driving voltage across the second and third windings connected in series while measuring a third mutual inductance voltage across the first winding;

applying the second driving voltage across the second and third windings connected in series while measuring a fourth mutual inductance voltage across the first winding;

combining the third measured mutual inductance voltage and the fourth measured mutual inductance voltage to generate a second mutual inductance signal; and estimating an angular position of the spindle motor based on a zero crossing of the first mutual inductance signal, a zero crossing of the second mutual inductance signal, and a mutual crossing of the first mutual inductance signal with the second mutual inductance signal.

20. The method as recited in claim 19, wherein the mutual crossing is separated from the zero crossing of the first mutual inductance signal by approximately thirty electrical degrees of the spindle motor.

21. Control circuitry comprising a plurality of switches, wherein the control circuitry is configured to:

configure the switches to connect in series a first winding and a second winding of a spindle motor configured to rotate a disk;

apply a first driving voltage across the first and second windings connected in series while measuring a first mutual inductance voltage across a third winding of the spindle motor, wherein the first driving voltage comprises a first amplitude and a first polarity;

apply a second driving voltage across the first and second windings connected in series while measuring a second mutual inductance voltage across the third winding, wherein the second driving voltage comprises the first amplitude and a second polarity opposite the first polarity;

combine the first measured mutual inductance voltage and the second measured mutual inductance voltage to generate a first mutual inductance signal; and estimate an angular position of the spindle motor based on the first mutual inductance signal.

22. The control circuitry as recited in claim 21, wherein the control circuitry is further configured to generate the first mutual inductance signal by adding the first measured mutual inductance voltage and the second measured mutual inductance voltage.

23. The control circuitry as recited in claim 21, wherein the control circuitry is further configured to estimate the angular position of the spindle motor based on a zero crossing of the first mutual inductance signal.

24. The control circuitry as recited in claim 21, wherein the control circuitry is further configured to:

configure the switches to connect in series the second winding and the third winding of the spindle motor;

apply the first driving voltage across the second and third windings connected in series while measuring a third mutual inductance voltage across the first winding;

apply the second driving voltage across the second and third windings connected in series while measuring a fourth mutual inductance voltage across the first winding;

combine the third measured mutual inductance voltage and the fourth measured mutual inductance voltage to generate a second mutual inductance signal; and estimate an angular position of the spindle motor based on the first mutual inductance signal and the second mutual inductance signal.

25. The control circuitry as recited in claim 24, wherein the control circuitry is further configured to generate the second mutual inductance signal by adding the third measured mutual inductance voltage and the fourth measured mutual inductance voltage.

26. The control circuitry as recited in claim 24, wherein the control circuitry is further configured to estimate the angular position of the spindle motor based on a mutual crossing of the first mutual inductance signal with the second mutual inductance signal.

27. The control circuitry as recited in claim 26, wherein the control circuitry is further configured to estimate the angular position of the spindle motor based on a zero crossing of the first mutual inductance signal and a zero crossing of the second mutual inductance signal.

28. The control circuitry as recited in claim 27, wherein the mutual crossing is separated from the zero crossing of the first mutual inductance signal by approximately thirty electrical degrees of the spindle motor.

29. Control circuitry comprising a plurality of switches, wherein the control circuitry is configured to:

configure the switches to connect in series a first winding and a second winding of a spindle motor configured to rotate a disk;

apply a first driving voltage across the first and second windings connected in series while measuring a first mutual inductance voltage across a third winding of the spindle motor;

apply a second driving voltage across the first and second windings connected in series while measuring a second mutual inductance voltage across the third winding;

combine the first measured mutual inductance voltage and the second measured mutual inductance voltage to generate a first mutual inductance signal;

configure the switches to connect in series the second winding and the third winding of the spindle motor;

apply the first driving voltage across the second and third windings connected in series while measuring a third mutual inductance voltage across the first winding;

apply the second driving voltage across the second and third windings connected in series while measuring a fourth mutual inductance voltage across the first winding;

combine the third measured mutual inductance voltage and the fourth measured mutual inductance voltage to generate a second mutual inductance signal; and estimate an angular position of the spindle motor based on a zero crossing of the first mutual inductance signal, a zero crossing of the second mutual inductance signal, and a mutual crossing of the first mutual inductance signal with the second mutual inductance signal.

30. The control circuitry as recited in claim 29, wherein the mutual crossing is separated from the zero crossing of the first mutual inductance signal by approximately thirty electrical degrees of the spindle motor.

31. A device comprising:

an electric motor comprising a plurality of windings including a first, second and third winding configured to rotate the electric motor; and control circuitry configured to:

apply a first driving voltage across the first and second windings connected in series while measuring a first mutual inductance voltage across the third winding, wherein the first driving voltage comprises a first amplitude and a first polarity;

apply a second driving voltage across the first and second windings connected in series while measuring a second mutual inductance voltage across the third winding, wherein the second driving voltage comprises the first amplitude and a second polarity opposite the first polarity;

combine the first measured mutual inductance voltage and the second measured mutual inductance voltage to generate a first mutual inductance signal; and estimate an angular position of the spindle motor based on the first mutual inductance signal.

32. The device as recited in claim 31, wherein the control circuitry is further configured to generate the first mutual inductance signal by adding the first measured mutual inductance voltage and the second measured mutual inductance voltage.

33. The device as recited in claim 31, wherein the control circuitry is further configured to estimate the angular position of the spindle motor based on a zero crossing of the first mutual inductance signal.

34. The device as recited in claim 31, wherein the control circuitry is further configured to:

apply the first driving voltage across the second and third windings connected in series while measuring a third mutual inductance voltage across the first winding;

apply the second driving voltage across the second and third windings connected in series while measuring a fourth mutual inductance voltage across the first winding;

combine the third measured mutual inductance voltage and the fourth measured mutual inductance voltage to generate a second mutual inductance signal; and estimate an angular position of the spindle motor based on the first mutual inductance signal and the second mutual inductance signal.

35. The device as recited in claim 34, wherein the control circuitry is further configured to generate the second mutual inductance signal by adding the third measured mutual inductance voltage and the fourth measured mutual inductance voltage.

36. The device as recited in claim 34, wherein the control circuitry is further configured to estimate the angular position of the spindle motor based on a mutual crossing of the first mutual inductance signal with the second mutual inductance signal.

37. The device as recited in claim 36, wherein the control circuitry is further configured to estimate the angular position of the spindle motor based on a zero crossing of the first mutual inductance signal and a zero crossing of the second mutual inductance signal.

38. The device as recited in claim 37, wherein the mutual crossing is separated from the zero crossing of the first mutual inductance signal by approximately thirty electrical degrees of the spindle motor.

39. A device comprising:

an electric motor comprising a plurality of windings including a first, second and third winding configured to rotate the electric motor; and control circuitry configured to:

apply a first driving voltage across the first and second windings connected in series while measuring a first mutual inductance voltage across the third winding;

apply a second driving voltage across the first and second windings connected in series while measuring a second mutual inductance voltage across the third winding;

combine the first measured mutual inductance voltage and the second measured mutual inductance voltage to generate a first mutual inductance signal;

apply the first driving voltage across the second and third windings connected in series while measuring a third mutual inductance voltage across the first winding;

apply the second driving voltage across the second and third windings connected in series while measuring a fourth mutual inductance voltage across the first winding;

combine the third measured mutual inductance voltage and the fourth measured mutual inductance voltage to generate a second mutual inductance signal; and estimate an angular position of the spindle motor based on a zero crossing of the first mutual inductance signal, a zero crossing of the second mutual inductance signal, and a mutual crossing of the first mutual inductance signal with the second mutual inductance signal.

40. The device as recited in claim 39, wherein the mutual crossing is separated from the zero crossing of the first mutual inductance signal by approximately thirty electrical degrees of the spindle motor.

\* \* \* \* \*